United States Patent [19]

Vick

[11] Patent Number: 5,033,794
[45] Date of Patent: Jul. 23, 1991

[54] SECURING DEVICE FOR DUMP TRUCK

[75] Inventor: Henry L. Vick, Birmingham, Ala.

[73] Assignee: Lanson Industries, Inc., Cullman, Ala.

[21] Appl. No.: 601,020

[22] Filed: Oct. 18, 1990

Related U.S. Application Data

[63] Continuation of Ser. No. 380,992, Jul. 17, 1989, abandoned.

[51] Int. Cl.$^5$ ............................................. B60P 1/16
[52] U.S. Cl. ..................................... 298/22 R; 298/38
[58] Field of Search ................ 298/38, 22 R, 22 D, 298/22 B

[56] References Cited

U.S. PATENT DOCUMENTS

| | | | |
|---|---|---|---|
| 513,446 | 1/1894 | Trapp | 298/22 R |
| 2,842,398 | 7/1958 | Chaney | 298/22 R |
| 3,022,111 | 2/1962 | Hutchinson | 298/22 R |
| 3,235,284 | 2/1966 | Yant | 298/22 R |
| 3,447,834 | 6/1969 | Grosse-Rhode | 298/22 R |
| 4,194,787 | 3/1980 | Williamsen | 298/22 R X |
| 4,326,749 | 4/1982 | Bender | 298/22 R |
| 4,699,428 | 10/1987 | Vick | 298/23 MD |

FOREIGN PATENT DOCUMENTS

| | | | |
|---|---|---|---|
| 307898 | 1/1969 | Sweden | 298/22 R |
| 196495 | 4/1923 | United Kingdom | 298/22 R |

Primary Examiner—Robert J. Spar
Assistant Examiner—William M. Hienz
Attorney, Agent, or Firm—Jennings, Carter, Thompson & Veal

[57] ABSTRACT

A locking device for a hydraulically operated dump truck secures the lift cylinder against unwanted oscillation when the dump body is in the lowered travel position by securing the top of the cylinder to the doghouse of the dump body. The cylinder is connected to the bottom of the dump body for lift purposes and pivots away from the doghouse during lifting.

10 Claims, 5 Drawing Sheets

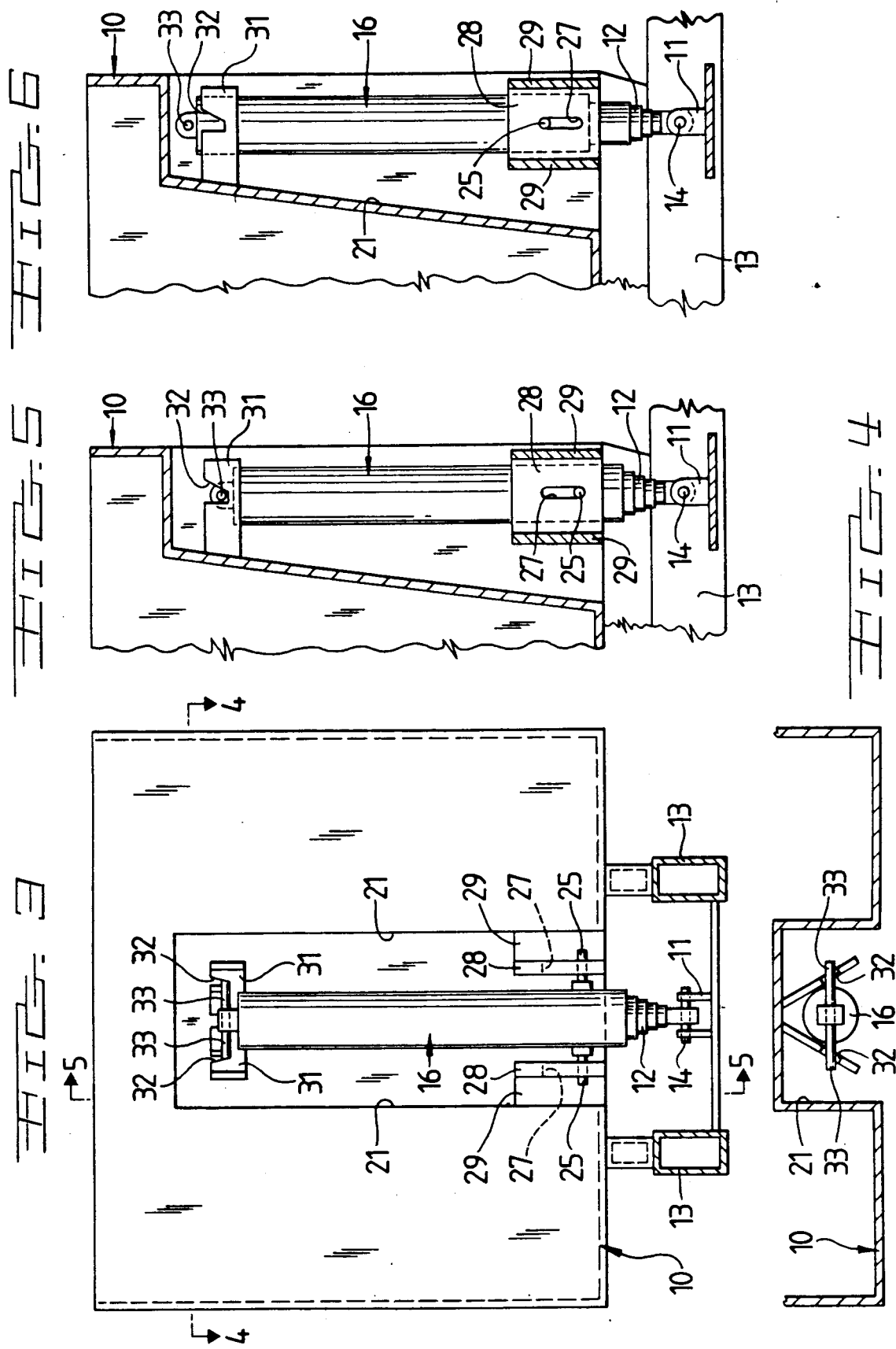

SECURING DEVICE FOR DUMP TRUCK

This is a continuation application filed pursuant to 37 CFR 1.62 of pending application Ser. No. 07/380,992, filed on July 17, 1989, now abandoned.

FIELD OF THE INVENTION

The present invention relates to land vehicles and in particular to land vehicles equipped with a dumping assembly that pivots around a fixed horizontal axis and more particularly to the elevating and tilting mechanism, specifically being a fluid-pressure operated mechanism. In even greater particularity, the present invention relates to an improvement in such fluid-operated mechanisms which provides a means of securing such fluid-operated mechanisms against excessive vibration when not in operation.

BACKGROUND OF THE INVENTION

Industrial dump trucks, utilizing a fixed horizontal axis about which the dump body tilts, normally employ some type of lift means to actually raise the forward end of the dump body. Typically, the lift means employed is a fluid-operated cylinder and rod mechanism with telescoping rod members.

Normally the rod is encased within a cylinder casing when the fluid-operated mechanism is in a retracted position with the outermost extension of the rod being pivotally attached to the truck frame and the cylinder being pivotally attached to the lower portion of the dump body proximal the lowermost portion of the cylinder casing. Accordingly, when the truck body is in its lowered position, i.e., its travel position, the pivotal connection of the rod to the frame is separated from the pivotal connection of the casing to the dump body by only a few inches. Due to the vibrating conditions of ground travel and the degree of freedom of movement created by the proximity of the pivotal connections, the cylinder tends to vibrate and may cause the casing to impact the truck cab and the dump body thereby damaging the cylinder, the cab and the dump body. An extremely noisy nuisance for the human occupants of the truck is also an adverse result of this type prior art connection.

SUMMARY OF THE INVENTION

It is the object of this invention to provide a fluid-operated lifting mechanism for tilting the dump body of a dump truck which is self securing upon towering the dump body.

Another object of this invention is to provide a means for automatically disengaging the lifting mechanism from its secured position upon the raising of the dump body.

These objectives are accomplished by a guiding means which allows the lifting mechanism to tilt the dump body and control the movement of the lifting mechanism in and out of the securing means as the telescoping rod alternately retracts and extends.

In a first embodiment, my invention utilizes an inverted U-shaped guide frame having a cross member attached to the lifting means. The guide frame is connected to the dump body by lift pins extending from the dump body through elongated vertical guide slots in the legs of the guide frame. As the telescoping rod is extended the guide frame is raised. The guide slots in the guide frame allows the guide frame to move some distance before the pins seat in the bottom of the slots. This allows the guide frame to lift out of a set of retaining brackets mounted to the truck body. As this lift continues the dump body pivots about the horizontal axis, with displacement of the securing hooks toward the rear of the truck. The guide frame pivots about the pins away from the dump body.

On retraction of the telescoping shaft, the guide frame pivots into its original position above the securing brackets As the lift means continues to retract the guide frame will descend into the securing bracket.

The second embodiment of my invention excludes the use of the guide frame and directly connects the cylinder casing of the lift mechanisms by means of lift pins to lift plates attached to the dump body which contain guide slots as described in the first adaptation. The upper end of the cylinder is secured by a securing bracket similar in nature to the securing bracket described in the first embodiment. As the lift means extends, the lift pins move along the guide slots and the cylinder rises out of the securing bracket.

The third embodiment is similar to the second, except that the uppermost end of the cylinder is secured by two interlocking flanges rather than a securing bracket. The flanges are semi cone-shaped with one cone attached to the dump body, and the other attached to the uppermost end of the cylinder. As the lift means is retracted and moves downward the flange attached to the lift means slides over and around the flange attached to the dump body. By virtue of the weight applied by the retracted lift means and the sloping sides of the two flanges, a wedging action occurs thereby securing the lift means.

The fourth embodiment of my invention is similar to the second embodiment in some respects. The lift means is secured at its uppermost portion by a securing pin attached to the lift means and engaged by a securing bracket. This securing occurs when the lift means is in a retracted position. The lowermost end of the lift means is connected to the truck frame by a mounting means which allows pivotal movement of the lift means. The lift means is also secured to the lower portion of the dump body by a lift plate which allows pivotal movement in relation to the dump body.

The characteristic of the fourth embodiment which distinguishes it from the second is its method of engaging and disengaging the securing pin attached to the lift means. The securing bracket is pivotally attached to the rearmost wall of the doghouse and consists of two engaging members which extend around the sides of the left means and contain a notch on the lower side of each engaging member. A releasing arm is pivotally attached to the securing bracket some distance along one engaging member of the securing bracket. The releasing arm extends downward and pivotally attaches to a lever arm. The leverage arm is pivotally attached to the lower portion of the dump body by a mounting means, which is connected to the lever arm some distance from the pivotal connection of the releasing arm and the lever arm. The lever arm is also attached to and biased toward the lower portion of the dump body by a spring. The lever arm extends from its connection with the releasing arm on one end to its pivotal connection to the dump body and beneath the dump body to a roller device which rests on the truck frame. The roller is capable of longitudinal movement along the truck frame.

When the lift means is in a retracted position, the weight of the dump body urges the lever arm against the truck frame which extends the spring and pulls the releasing arm downward. The releasing arm pulls the pivotal securing bracket downward so that the notches on the underside of the securing bracket engage the securing pin attached to the lift means.

Upon extension of the lift means, the dump body rises, thereby relieving the force placed upon the lever arm. The spring exerts an upward pull on the lever arm and thereby raises the releasing arm. The releasing arm raises the securing bracket and disengages the securing pin.

Note that the lift plates on the fourth embodiment do not contain vertical guide slots thereby creating a simultaneous lift of the dump body with the extension of the lift means. The lift means is connected to the lift plates by lift pins that extend laterally through holes in the lift plates. The lift plates rotate around the lift pins as the lift means is extended and retracted.

BRIEF DESCRIPTION OF THE DRAWINGS

Apparatus embodying features of my invention are illustrated in the accompanying drawings which form a portion of this disclosure and wherein:

FIG. 3 is a partial front elevational view of the second embodiment of the apparatus with lift means in a retracted position;

FIG. 4 is a sectional view taken along line 4—4 of FIG. 3;

FIG. 5 is a sectional view taken along line 5—5 of FIG. 3 of the second adaptation;

FIG. 6 is a sectional view taken along line 5—5 of FIG. 3 with lift means sufficiently extended to raise lift rods to top of guide slot and to raise the securing pins out of securing bracket;

DESCRIPTION OF PREFERRED EMBODIMENTS

The novelty of my invention may be best understood by referring to the prior method of tilting the dump body of a dump truck, more specifically the dumping method utilizing, fluid-operated lifting means. The lift means consisted of a telescoping shaft that is capable of retracting into the hydraulic cylinder. The outermost end of the telescoping shaft is attached to the truck frame by a pivotal mounting means. The base of the casing of the hydraulic cylinder is pivotally mounted to the lower portion of the dump body, whereby on retraction the base of the hydraulic cylinder and the outermost end of the telescoping shift are drawn together.

This method allows the lift means to operate efficiently in its extended mode, however, on complete retraction the pivotal mounts are within such a close proximity that the hydraulic cylinder's upper end is free to oscillate. The effect of this oscillation is the cylinder impacts both the dump body and the truck cab when the truck is traveling. These impacts damage all three components as well as creates a great deal of noise.

Figure 1:
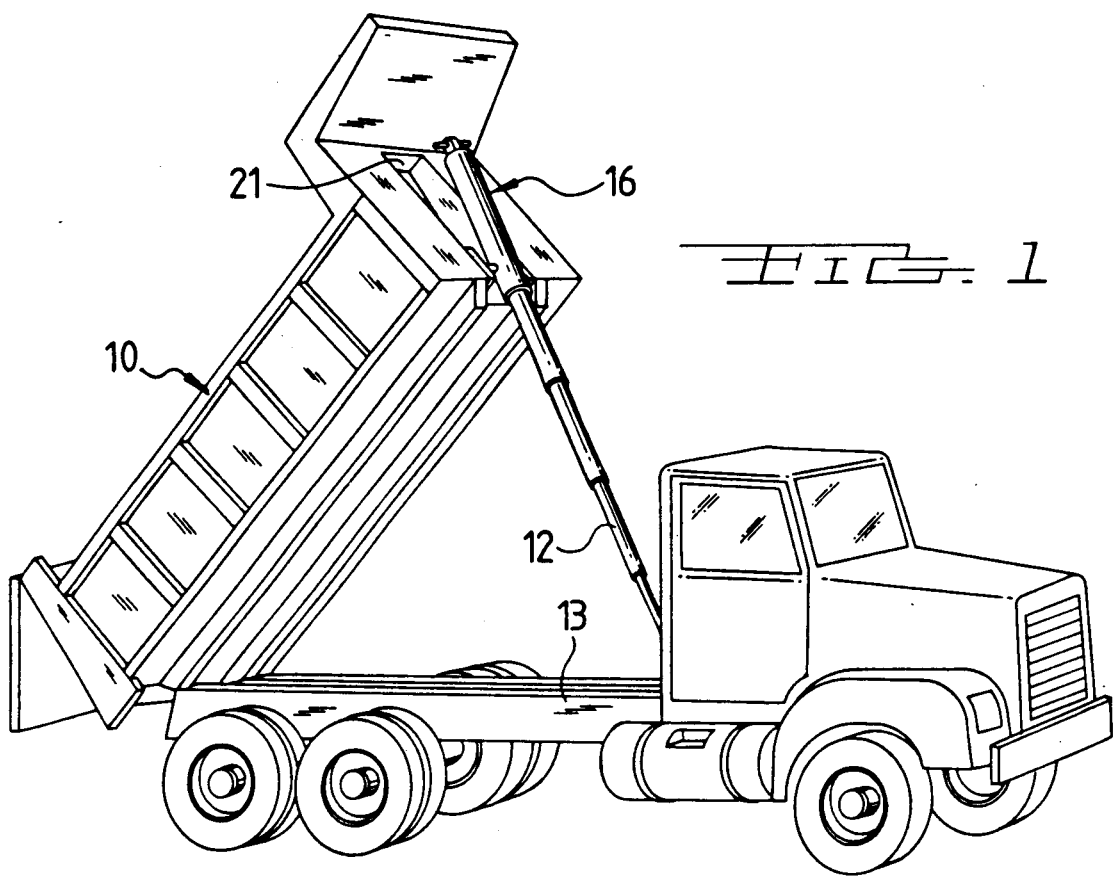
FIG. 1 is a perspective view of a dump truck employing the improved dump body lift assembly.
Figure 2:
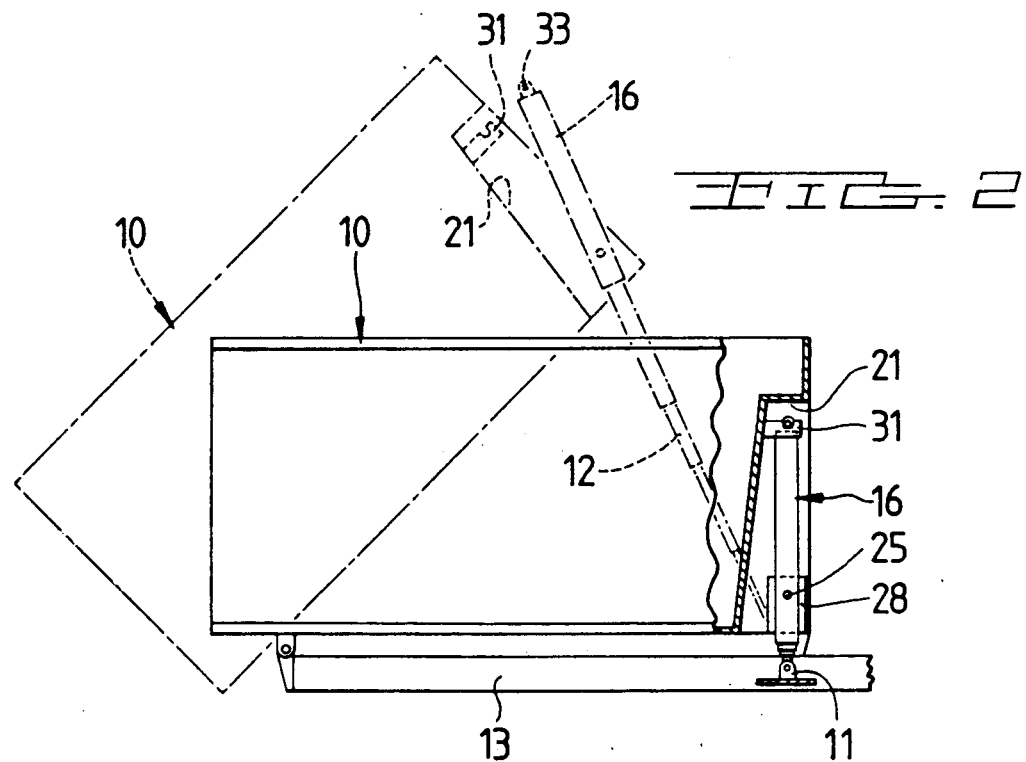
FIG. 2 is a partial side elevational view of the apparatus employed to tilt the dump body.
Figure 7:
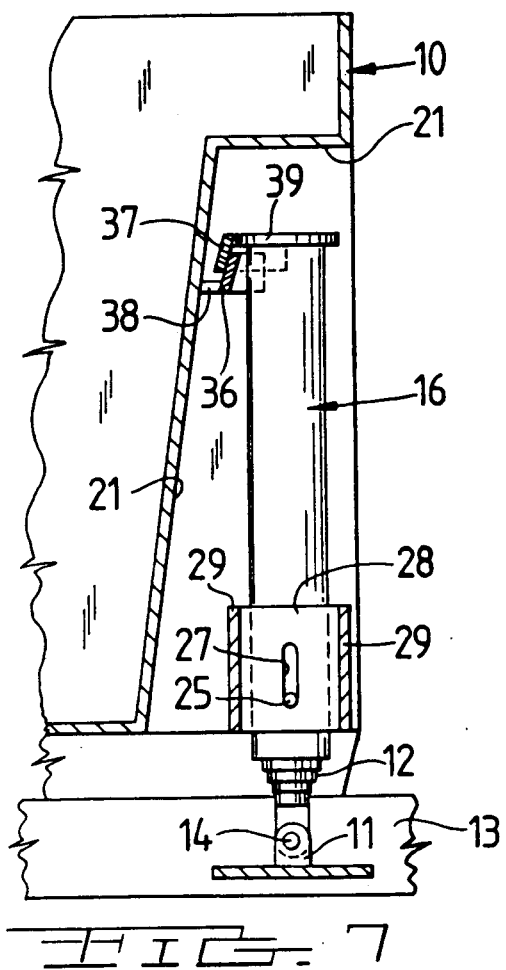
FIG. 7 is a sectional side view of a third embodiment taken along line 5—5 of FIG. 3;.
Figure 8:
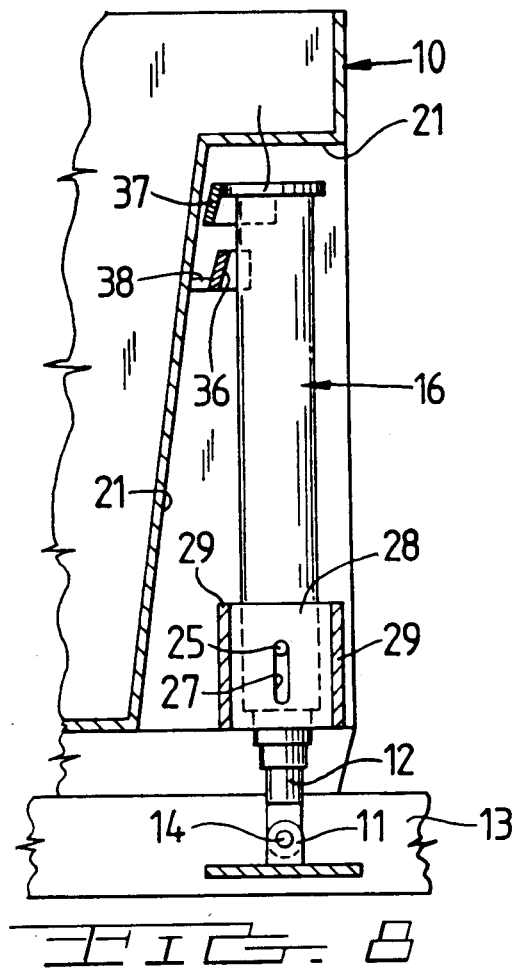
FIG. 8 is a sectional view of the third embodiment with the lift rod slightly extended.
Figure 9:
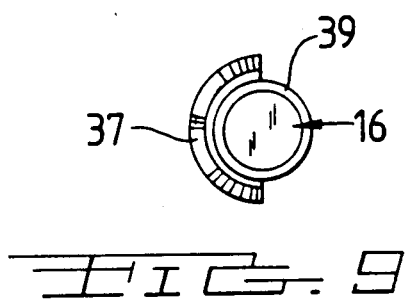
FIG. 9 is a top view of the lift cylinder, extension ring, and outside securing flange as positioned on my apparatus.
Figure 10:
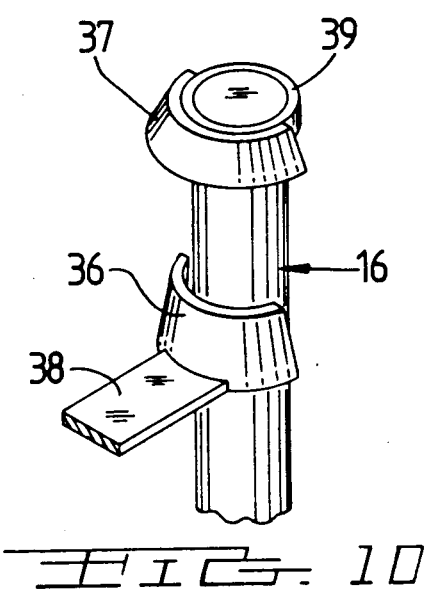
FIG. 10 is a perspective view of the uppermost end of the lift cylinder, the extension ring, the outer securing flange and inner securing flange as positioned immediate to securing of the lift cylinder.
Figure 12:
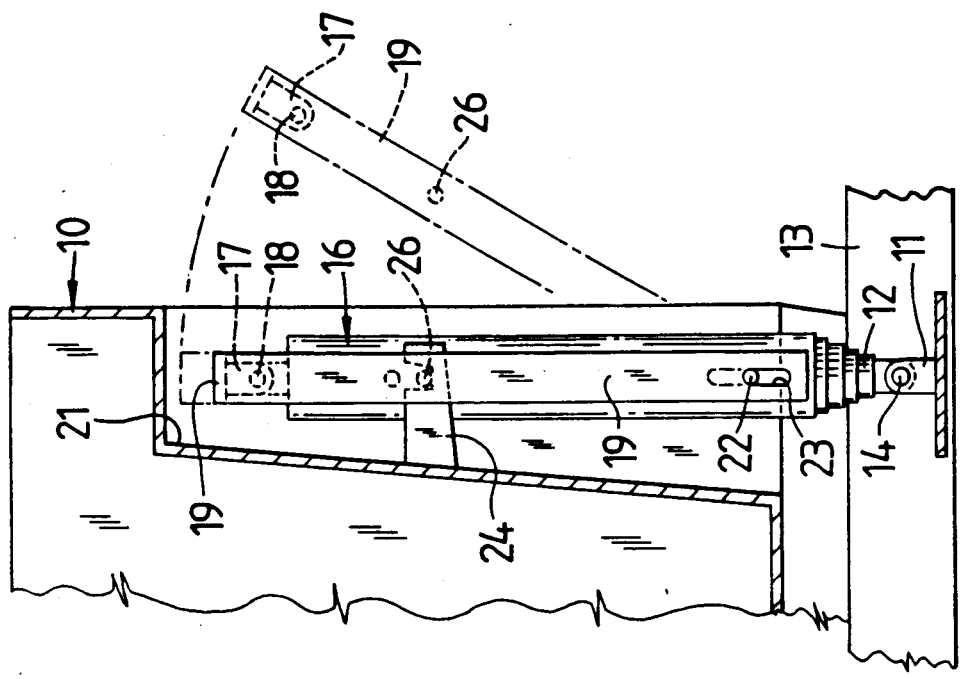
FIG. 12 is a sectional view taken along line 12—12 of FIG. 11 with the lift means extended until the securing pin is raised free of the securing bracket, also showing the alternate position of the guide stirrup as it raises and rotates in relation to the lift rods.
Figure 11:
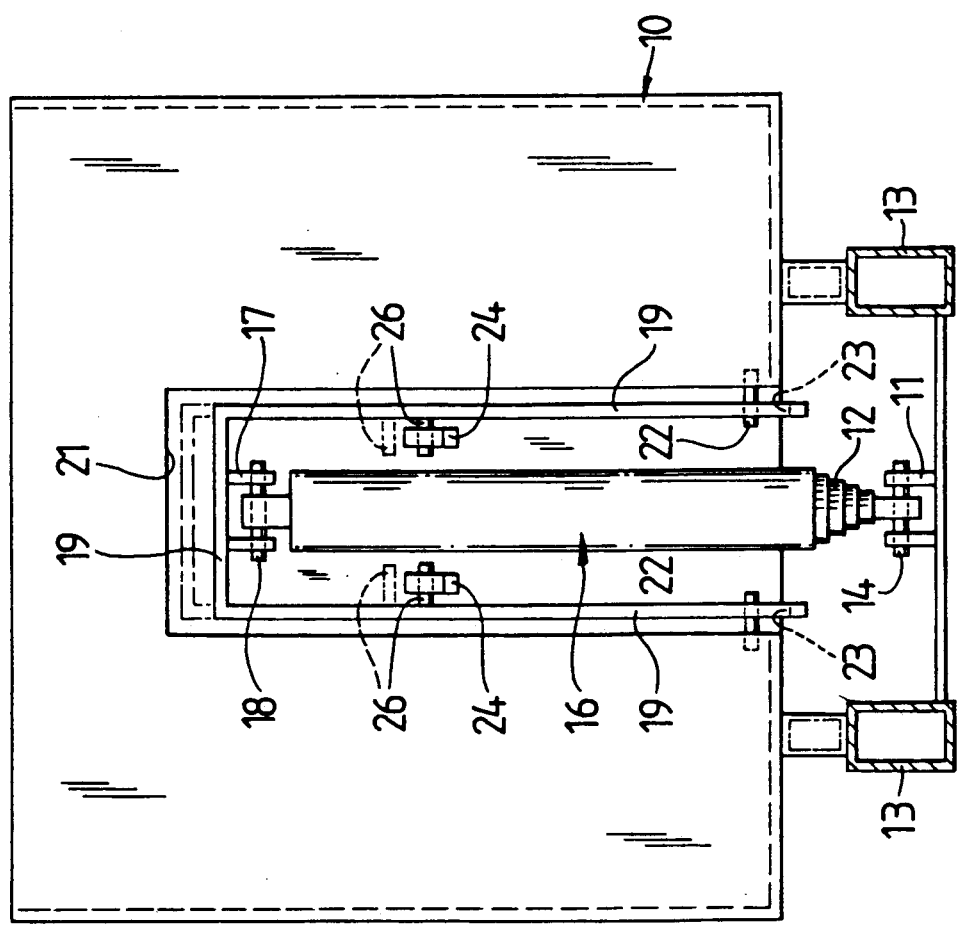
FIG. 11 is a front view of the first embodiment of the apparatus with the lift means in a retracted position.

With reference to FIGS. 11-12, my first embodiment of the improved dump body lift means assembly contains a mounting bracket 11 which attaches the telescoping rod 12 to the truck frame 13 with the aid of a first pivotal axis 14. The telescoping rod 12 is a integral part of the lift means and is selectively extended from and is retracted within the casing of the hydraulic cylinder 16. The hydraulic cylinder 16 is attached to a mounting bracket 17 by a pivot pin 18. The mounting bracket 17 is attached to the underside of a guidance stirrup 19 which is connected to the lower portion of a doghouse 21 of a dump body 10 by a plurality of lift pins 22, which are attached to the inner walls of the doghouse 21 and run through a set of vertically mounted guide slots 23 located with the lower portion of the guidance stirrup 19.

When the telescoping rod is in a retracted position the guidance stirrup 19 and thus the attached hydraulic cylinder 16 is secured to the rearmost wall of the doghouse 21 by a securing bracket 24. A pair of securing pins 26 are attached to the inner surface of the guidance stirrup 19 for cooperative engagement within the securing bracket 24 when the dump body is lowered.

As the telescoping shaft 12 is extended the guidance stirrup 19 is raised until the lowermost end of the guide slots 23 contact the lift pins 22. Simultaneously, the securing pins 26 are raised out of the securing bracket 24 a sufficient distance to free the cylinder as indicated on FIG. 11. As the telescoping rod 12 continues to extend the stirrup tilts the dump body toward the rear of the truck. As the dump body tilts toward the rear, the guidance stirrup 19 swings toward the front of the truck, pivoting around the lift pins 22. The uppermost end of the hydraulic cylinder 16 pivots on the pivot pin 18 and the lowermost end of the telescoping rod 12 pivots around the pivotal axis 14 attached to the truck frame 13. Since the securing pins 26 were raised above the securing bracket 24, the guidance stirrup 19 is unhindered by the securing bracket 24. On retraction of the telescoping rod 12, the securing pins 26 return to position above the securing bracket 24; and upon continued retraction descend into locking engagement within the securing bracket 24, thereby securing the guidance stirrup 19, the hydraulic cylinder 16, and the telescoping rod.

With reference to FIGS. 2-6, my second embodiment of the improved dump body lift assembly contains a mounting bracket 11 which attaches the telescoping shaft 12 to the truck frame 13 by a pivotal axis 14. The hydraulic cylinder 16 has a pair of laterally extending lift pins 25, which run through vertically oriented guide slots 27, within a pair of lift plates 28. Each lift plate 28 is attached to the inner walls of the doghouse 21, which is an enclosure within the dump body 10, by plurality of extension plates 29. When the telescoping rod 12 is in a retracted position, the hydraulic cylinder 16 is secured by a cylinder retainer 31 which is attached to the rearmost wall of the doghouse 21. The hydraulic cylinder 16 is secured within the cylinder retainer 31 by a retainer pin 33 which runs laterally from the uppermost end of the casing of the hydraulic cylinder 16 and fits within notches 32 located on the ends of the cylinder retainer 31. As the telescoping rod 12 is extended, the hydraulic cylinder 16 lifts and is vertically guided by means of the lift pins 25 moving within the guide slots 27 in the lift plates 28. As the lift pins 27 reach the uppermost limit of the guide slots (see FIG. 6), the retainer pin 33 is raised out of engagement with the cylinder retainer 31. As the telescoping shaft 12 continues to extend, the upward lift force is transferred to the dump body by means of the lift pins 25, lift plates 28 and extension plates 29. As the dump body tilts toward the rear of the truck (see FIG. 2), the hydraulic cylinder 16 tilts relative to the guide slots 27, located in the lift plates 28.

When the telescoping rod 12 retracts, the dump body returns to its original position and the hydraulic cylinder 16 returns to a position wherein the retainer pin 33 is directly above the notches 32 in the cylinder retainer 31. As the telescoping rod 12 continues to retract the retainer pin 33 descends into the notches 32 in the cylinder retainer 31, thereby locking the hydraulic cylinder 16 against lateral oscillation.

With reference to FIGS. 7-10, my third embodiment of the improved dump body lift assembly encompasses all of the items and methods described within the second embodiment except for the retainer pin 33 and the cylinder retainer 31. The third embodiment incorporates an inner securing flange 36 and an outer securing flange 37 over and around the inner securing flange 36 in a manner wedging the inner securing flange 36 between the outer securing flange 37 and the hydraulic cylinder 16. The inner securing flange 36 is attached to the rearmost wall of the doghouse 21 by a connecting member 38. The outer securing flange 37 is attached to the uppermost end of the hydraulic cylinder 16 by an extension ring 39. The extension ring 39 positions the outer securing flange 37 some radial distance away from the hydraulic cylinder 16, thereby creating space for the inner securing flange 36 to fit within the inner side of the outer securing flange 37.

Figure 13:
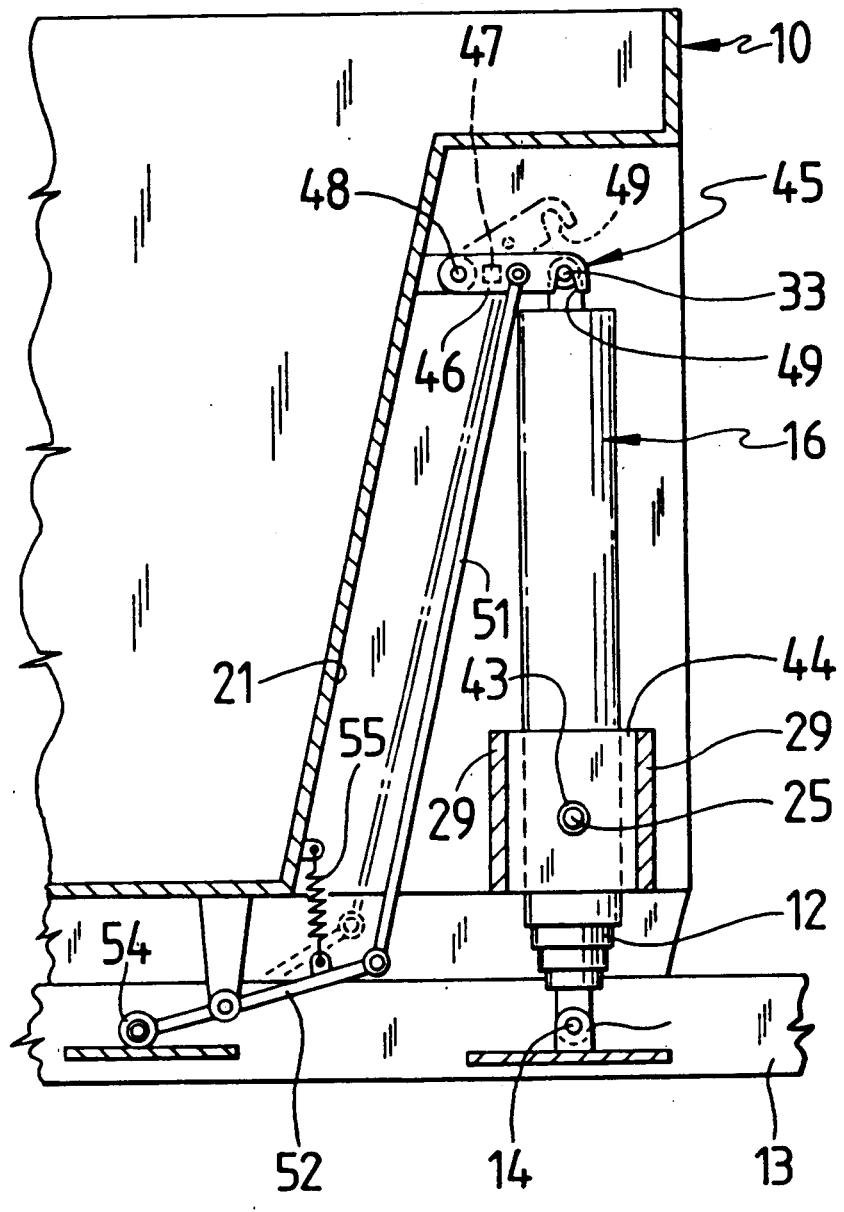
FIG. 13 is a partial side elevational view of the fourth embodiment of the apparatus with lift means in a retracted position.

With reference to FIG. 13, my fourth embodiment of the improved dump body lift means assembly incorporates many of the same features described in the second embodiment. A hydraulic cylinder 16 and a telescoping rod 12 are connected to the truck frame 13 by a pivotal axis 14 positioned within a mounting bracket 11. The hydraulic cylinder has a pair of laterally extending lift pins 25 which run through pin retainer 43 created within a pair of lift plates 44. Each lift plate 44 is attached to the inner walls of the doghouse 21, by a plurality of extension plates 29. The lift plates 44 described in this fourth embodiment differ from the lift plates 29 described in the second embodiment in that the lift plates 44 lack the vertically oriented guide slots 27. The pin retainers 43 allow the lift pins 25 to pivot in relation to the lift plates 44 but do not allow any vertical movement of the lift pins 25 within lift plates 44. The extension of the telescoping rod 12 therefore results in an immediate lifting of the dump body.

The hydraulic cylinder 16 is secured when the telescoping rod 12 is in a retracted position by means of a pivoting cylinder retainer generally indicated at 45, which is connected to the rearmost wall of the doghouse 21 vertically displaced a height similar to the uppermost end of the casing of the hydraulic cylinder 16. The pivoting cylinder retainer 45 embodies two arm members 46 extending away from the rearmost wall of the doghouse 21, being joined at one end by a cross member 47. The arm member 46 is connected to the doghouse 21 by a horizontally oriented pivotal axis 48. The pivoting cylinder retainers 45 engages a retainer pin 33, which runs laterally from the uppermost end of the casing of the hydraulic cylinder 16, by notches 49 cut in the underside of the arm members 46. A releasing arm 51 is pivotally connected to the pivotal cylinder retainer 45 some distance along one of the beam members 46. The releasing arm 51 extends downward to a pivotal connection with a lever arm 52 which is connected at some mid point to the underside of the dump body by a pivotal mount 53. The lever arm 52 terminates with a roller 54 which is movable longitudinally along the truck frame 13. The lever arm 52 is connected to and biased toward the dump body by a lift spring 55, which exerts an upward force along the releasing arm 51 and thereby the pivoting cylinder retainer 45.

As the telescoping rod 12 is extended from a fully retracted position, the dump body immediately begins to rise as a result of the force exerted on the lift plates 44. As the dump body rises, the lift spring 55 exerts bias on the lever arm 52 and raises the releasing arm 51. As the releasing arm 51 rises the arm members 46 pivot upward and around the pivot axis 48, thereby disengaging the retainer pin 33 from the notches 49 located on the underside of the arm members 46.

As the telescoping rod 12 is retracted, the weight of the dump body urges the lever arm 52 against the frame which pulls the releasing arm 51 downward. The arm members 46 descend, thereby securing the retainer pin 33 within the notches 49 located on the underside of the arm members 46.

While I have shown my invention in several forms, it will be obvious to one skilled in the art that it is not so limited, but is susceptible of various other changes and modifications without departing from the spirit thereof.

What I claim is:

1. An apparatus at least partially enclosed within the doghouse of a dump body mounted on a truck frame for tilting one end of said dump body, comprising:
   (a) lift means for raising and lowering said dump body pivotally attached to the bottom of the forward portion of said dump body by a pair of lift plates attached to the lower portion of the inner wall of said doghouse of said dump body wherein each of said lift plates has a vertically extending elongated guide slot defined therein and a pair of lift pins attached to said lift means and extending laterally therefrom for sliding engagement with said guide slots; and
   (b) securing means detachably connecting said dump body and said lift means at a predetermined height above the pivotal attachment of said lift means to said dump body with said lift means being detached from said securing means and movable in relation to said securing means during the operation of said lift means, said securing means locking and securing said lift means against excessive vibration while said dump body is in a lowered position.

2. Apparatus as described in claim 1 wherein said lift means comprises a hydraulic cylinder and telescoping shaft wherein said shaft may be retracted within said hydraulic cylinder.

3. Apparatus as described in claim 2, in which said securing means comprises a cylinder retainer, wherein said cylinder retainer secures said lift means when said lift means is in a retracted position.

4. Apparatus as described in claim 3 wherein said cylinder retainer comprises two arm members extending from the rearmost wall of said doghouse on either side of said lift means.

5. Apparatus as described in claim 3 wherein said lift means is attached to the truck frame by a mounting means which allows pivotal movement of said lift means in relation to said truck frame.

6. Apparatus as described in claim 2 wherein said securing means comprises:
   (a) an inner securing flange;
   (b) an outer securing flange; and
   (c) an extension ring wherein said outer securing flange is attached to said extension ring which is attached to the uppermost end of said lift means and said inner securing flange is attached to the rearmost wall of said doghouse by a beam member.

7. Apparatus as described in claim 6 wherein said inner securing flange is attached to said doghouse at a height to engage said inner securing flange within said outer securing flange when said lift means is in a retracted position.

8. Apparatus as described in claim 6 wherein said outer securing flange comprises a semi-circular cone-shaped member attached to the uppermost end of said hydraulic cylinder by said extension ring, said extension ring being positioned around uppermost edge of said hydraulic cylinder and outer securing flange is positioned around said extension ring in a manner wherein the inner surface of said outer securing flange contacts the outer surface of said inner securing flange when said lift means is in a retracted position, thereby securing said lift means, against lateral oscillation.

9. Apparatus at least partially enclosed within the doghouse of a dump body mounted on a truck frame for tilting one end of said dump body, comprising:
   (a) lift means pivotally attached to said dump body at a lower forward portion thereof for raising and lowering said dump body including a hydraulic cylinder and telescoping shaft wherein said shaft may be retracted within said hydraulic cylinder; and
   (b) securing means attachable to said lift means, said lift means being movable in relation to said securing means during operation of said lift means, said securing means locking said lift means in a low vibration position while said lift means is in a retracted position and including a cylinder retainer, having two arm members extending from the rearmost wall of said doghouse with said hydraulic cylinder extending therebetween said arm members of said cylinder retainer containing notches in an upper side thereof for engaging a retainer pin secured to the upper portion of said lift means when said lift means is in a retracted position.

10. Apparatus as described in claim 9 wherein said arm members are located at a predetermined height relative to said dump body and said lift means.

* * * * *